United States Patent
Modic

(10) Patent No.: US 6,258,892 B1
(45) Date of Patent: Jul. 10, 2001

(54) TOUGHENED BLENDS OF ALPHA POLYAMIDES AND FUNCTIONALIZED BLOCK COPOLYMERS

(75) Inventor: Michael John Modic, Houston, TX (US)

(73) Assignee: Shell Oil Company, Houston, TX (US)

(*) Notice: Subject to any disclaimer, the term of this patent is extended or adjusted under 35 U.S.C. 154(b) by 0 days.

(21) Appl. No.: 09/300,622

(22) Filed: Apr. 27, 1999

Related U.S. Application Data

(60) Provisional application No. 60/086,193, filed on May 21, 1998.

(51) Int. Cl.$^7$ ........................................... C08L 77/00
(52) U.S. Cl. .................................. 525/66; 525/183
(58) Field of Search .................................................. 525/66

(56) References Cited

U.S. PATENT DOCUMENTS

| | | | |
|---|---|---|---|
| 4,167,505 | * 9/1979 | Dunkelberger | 525/66 |
| 4,174,358 | 11/1979 | Epstein | 525/183 |
| 4,346,194 | * 8/1982 | Roura | 525/66 |
| 4,427,828 | 1/1984 | Hergenrother et al. | 525/66 |
| 4,628,072 | 12/1986 | Shiraki et al. | 525/57 |
| 4,849,471 | * 7/1989 | Saito et al. | 525/66 |
| 5,147,944 | * 9/1992 | Takeda | 525/432 |
| 5,242,975 | 9/1993 | Modic | 525/66 |
| 5,274,033 | * 12/1993 | Epstein | 525/66 |

OTHER PUBLICATIONS

"Interactions at the PA–6/PA–66 Interface," by Frantisek and P. H. Geil, *Journal of Applied Polymer Science*, vol. 46, pp. 797–803 (1992).

* cited by examiner

*Primary Examiner*—Ana Woodward
(74) *Attorney, Agent, or Firm*—Donald F. Haas

(57) ABSTRACT

This invention is a toughened alpha-polyamide composition which has been admixed at a maximum shear rate of at least 400 sec$^{-1}$ and which comprises:

(a) 10 to 30, preferably 15 to 25, percent by weight (%wt) of a maleic anyhydride or acid functionalized polydiene polymer, (b) 60 to 89% wt of an alpha-polyamide, and (c) 1 to 10% wt of a polyamide prepared by copolymerizing a diamine and a dicarboxylic acid.

10 Claims, No Drawings

TOUGHENED BLENDS OF ALPHA POLYAMIDES AND FUNCTIONALIZED BLOCK COPOLYMERS

This application claims the benefit of U.S. Provisional Application No. 06/086,193 filed May 21, 1998, the entire disclosure of which is hereby incorporated by reference.

FIELD OF THE INVENTION

This invention relates to blends of alpha polyamides with functionalized elastomers. More particularly, this invention relates to blends of Nylon 6 and maleated star polymers with improved impact efficiency.

BACKGROUND OF THE INVENTION

Polyamides, known commercially as nylons, have excellent hardness, abrasion resistance, chemical resistance, and other mechanical properties, but suffer from being brittle. Many attempts have been made to make polyamides less brittle by blending them with impact modifiers such as rubbery polymers. For instance, U.S. Pat. No. 4,174,358 discloses the use of functionalized rubbers as impact modifiers for polyamides and U.S. Pat. Nos. 4,427,828 and 4,628,072 disclose the use of acid functionalized, hydrogenated block copolymers of styrene and dienes as similar impact modifiers. The inclusion of polar functional groups on the modifiers is generally considered to be necessary for the polyamides to be acceptably compatible with rubbers which do not otherwise contain polar functionality.

The use of acid derivative functionalized hydrogenated styrenic block copolymers as impact modifiers has been found to be particularly effective in modifying polyamides which are prepared by copolymerizing diamines and dicarboxylic acids, for example, Nylon 6,6. However, polyamides which are prepared by polymerizing monoaminocarboxylic acids or internal lactams thereof, such as Nylon 6, are more difficult to toughen with acid functionalized hydrogenated block copolymers.

U.S. Pat. No. 5,242,975 describes a process for producing impact modified blends of these functionalized block copolymers and nylons like Nylon 6 which are herein generally referred to as alpha polyamides and have carboxylic acid or a derivative thereof as one terminal group and an amine as another terminal group. These alpha polyamides may be formed by ring-opening of lactams and polymerization of monoaminocarboxylic acids. The method of making a good impact modified Nylon 6 blend comprises blending a masterbatch which contains 15 to 120 parts of the alpha-polyamide and 100 parts of the functionalized block copolymer. This masterbatch is then later blended with a sufficient amount of the alpha-polyamide to result in a total of from 200 to 2000 parts by weight of the alpha-polyamide in the resultant toughened alpha-polyamide composition.

While the afore-mentioned masterbatch method works quite well, it does suffer from the following disadvantages: a specific extruder and feeder system is needed to be able to easily control the polymer feed rates and to maintain a constant blend composition. Therefore, it can be seen that it would be highly advantageous to be able to produce blends of alpha polyamides (Nylon 6) and functionalized block copolymers with excellent impact properties by direct blending. The present invention provides such compositions.

SUMMARY OF THE INVENTION

This invention is a toughened alpha-polyamide composition which has been admixed at a maximum shear rate of at least 400 sec$^{-1}$ and which comprises:

(a) 10 to 30, preferably 15 to 25, percent by weight (%wt) of an acid functionalized polydiene polymer,
(b) 60 to 89 % wt of an alpha-polyamide, and
(c) 1 to 10% wt of a polyamide prepared by copolymerizing a diamine and a dicarboxylic acid.

DESCRIPTION OF THE INVENTION

The polyamides useful in this invention as the main component, which will be referred to as alpha polyamides, include those polyamides which have one terminal amine and one terminal carboxylic acid group. This will be the case for polyamides which are formed by ring-opening of lactams and polymerization of monoamino carboxylic acids. Suitable polyamides are described in U.S. Pat. Nos. 2,071,250; 2,071,251; 2,241,322; and 5,242,975 which are incorporated herein by reference.

Examples of amino carboxylic acids include epsilonamino caproic acid, and 3- and 4-amino benzoic acids. Examples of lactams include butyrolactam, pivalolactam, caprolactam, capryllactam, enantholactam, undecanolactam, and dodecanolactam. Illustrative examples of polyamides which may be used as a main component of the compositions of the present invention include polypyrrolidone (nylon-4), polycaprolactam (Nylon 6), polyheptolactam (nylon-7), polycapryl lactam (nylon-8), polynonanolactam (nylon-9), polyundecanolactam (nylon-11), and polydodecanolactam (nylon-12).

The acid functionalized hydrogenated conjugated diene polymer (polydiene) may be prepared by functionalizing an appropriate base polymer or by copolymerizing acid containing monomers, including anhydrides, with conjugated dienes, especially isoprene and/or butadiene. Other types of monomer units may also be incorporated into the polymer especially styrene and styrene derivatives which may form separate discrete blocks of, i.e., polystyrene or which may be randomly distributed throughout the polydiene polymer. These other types of monomer units may be incorporated in random, block, or tapered fashion. The amount of other monomers which may be incorporated into the polymer depends greatly on the properties of the polymers derived from these other monomers. These polymers are described in more detail in U.S. Pat. Nos. 5,242,975 and Re. 27,145 which are herein incorporated by reference.

The acid functionalized hydrogenated conjugated diene polymer may be of radial, linear, or branched configuration, but is preferably of a radial or star configuration. Linear polymers of functionalized conjugated diene polymers are also useful herein but are generally supplied as bales and not crumbs due to excessive cold-flow. The preferred radial or star acid functionalized hydrogenated polydiene polymer has from 3 to 30 arms extending from a suitable coupling agent. The diene polymer arms may be homopolymers or copolymers of conjugated dienes having from 4 to 12 carbon atoms, preferably isoprene and/or butadiene.

Any of the coupling agents known in the art to be useful in the production of radial polymers may be used in preparing the radial polymers of the present invention. Suitable coupling agents include those which are nonpolymerizable and which contain a fixed number of reactive sites, such as tetrachlorobenzene, carbon tetrachloride, and silicon tetrachloride. Coupling agents which are polymerizable are also acceptable, such as the polyalkenyl coupling agents like divinylbenzene taught in U.S. Pat. No. 3,985,830, Canadian Patent No. 716,645, and British Patent No. 1,025,295 which are all incorporated herein by reference.

Radial polymers useful as modifiers in the compositions of this invention may be prepared using the techniques described in U.S. Pat. Nos. 4,116,917 and 4,156,673 which are herein incorporated by reference. The conjugated diene polymer arms used in these s polymers will have a number average molecular weight within the range from about 200 to about 500,000. The radial polymer is usually hydrogenated so as to hydrogenate at least 90 percent of the initial ethylenic unsaturation contained in the polymer. Preferably, the hydrogenation will be greater than 98 percent. The hydrogenation can be accomplished as taught in U.S. Pat. No. 3,700,633 which is herein incorporated by reference.

When the base polymer does not contain acid derivative functionality, the functionality must be grafted onto the base polymer. In general, any carboxylic acid or derivative thereof having the ability to react with the base polymer in a free radical initiated reaction is useful to effect the modification needed for the compositions of the present invention. Useful modifying compounds may be polymerizable or nonpolymerizable compounds but are preferably nonpolymerizable or only slowly polymerizable.

While any acid or acid derivative which may be grafted or otherwise reacted with the hydrogenated radial polymer may be used, the compounds most commonly used contain ethylenic unsaturation. In general, essentially any acid or acid derivative could, initially, be incorporated into the base polymer so long as these groups can be conveniently converted to a functional group which will facilitate performance of the modified polymer as an impact modifier. Groups that are particularly effective include acid, salt, anhydrides, esters, imides, and amides. Preferred compounds which may be grafted to the base polymer include ethylenically unsaturated mono- and polycarboxylic acids and derivatives thereof, particularly dicarboxylic acids. These will contain from 3 to 10 carbon atoms and preferably a single ethylenic unsaturation. Suitable derivatives include the corresponding anhydrides, salts, esters, ethers, amides, nitriles, thiols, thio acids, glycidyls, cyanides, and the like. Examples of compounds which may be grafted to the base polymer include acrylic acid, methacrylic acid, maleic acid, fumaric acid, corresponding anhydrides of these acids, esters of these acids, glycidyl acrylate and methacrylate, and the like. Maleic anhydride is preferred.

The compound containing the functional group will be grafted to the base polymer in an amount within the range from about 0.1 to about 10, preferably about 0.3 to about 5, and most preferably from about 0.3 to about 3.0 weight percent based on the functionalized polymer. The base polymer may be functionalized using any of the techniques known in the prior art for grafting functional groups to such polymers. For example, the modified, hydrogenated radial polymer may be prepared using solution processes such as those taught in U.S. Pat. Nos. 4,033,888; 4,077,893; and 4,670,173, which are incorporated herein by reference, or with melt-mixing processes such as those taught in U.S. Pat. Nos. 4,427,828; 4,578,429; and 4,657,971, which are incorporated herein by reference.

The third component of the toughened polyamide composition of the present invention is a polyamide which is prepared by copolymerizing diamines and dicarboxylic acids. The preferred component for use herein is Nylon 6,6. This material is preferred because its processing conditions and mechanical properties are similar to those of Nylon 6 and because it is readily available. Other third components include Nylon 4,6, Nylon 6,9, Nylon 6,12, Nylon 6,T, and Nylon 12,12.

While not wishing to be bound by this theory, I believe that these improvements are due to the reduced overall crystallinity in the nylon matrix. Addition of an acid funtionalized polymer to either an alpha-polyamide or Nylon 6,6 will decrease the crystallinity of each of those nylons. However, I have found that the crystallinity of the alpha-polyamide/Nylon 6,6 matrix of the present invention is lower than either of the pure components in the presence of the acid functionalized polymer. I believe that this reduced amount of crystallinity increases the matrix ductility and thus the matrix stiffness decreases. This results in the dramatic improvements in both room temperature and low temperature performance which I have seen with this composition.

In order to achieve the intended advantages of the invention (which can, in part, be expressed as an increase in Notched Izod, a measure of toughness), it is necessary to achieve a minimum level of mixing in the composition. A maximum shear rate of at least 400 $sec^{-1}$ must be used to achieve an increase in Notched Izod. In order to achieve ductile behavior, which is most preferred, a maximum shear rate of at least 600 $sect^{-1}$ must be used. By maximum shear rate, I mean the shear rate at the location within the mixing apparatus where the shear is highest. In a corotating twin screw extruder, this is the gap between the kneading blocks.

The compositions prepared according to the present invention may incorporate other components known in the art to be useful in polyamide compositions. These other components include, for example, fillers, pigments, antioxidants, stabilizers, processing oils, extenders, mold release agents, and the like. These additives may generally be added to the composition or to the base alpha polyamide before the composition is made.

When alpha-polyamide compositions are modified according to the present invention, the resultant compositions have greater toughness than compositions prepared by blending the alpha-polyamide with the acid functionalized block copolymer alone. Because a desired toughness can be achieved with less modifier, the resultant compositions have significantly greater stiffness, as indicated by higher modulus than similarly tough compositions which were blended without the Nylon 6,6. The functionalized hydrogenated polymers are considerably more expensive than the alpha polyamides, so compositions prepared by the method of the present invention are less expensive than similarly tough compositions prepared without the Nylon 6,6. Ductile behavior is highly desirable because a high level of impact energy can be absorbed before part failure. As well, upon part failure, no chips or shards of the part are created and potentially thrown off For these systems, ductile behavior usually begins at a Notched Izod (NI) of 8. However, many useful products can be made with compositions having lower NI. This invention leads to an increase in NI at levels below and above 8.

EXAMPLES

Example 1

Nylon 6, Nylon 6,6, and a polyisoprene radial polymer having a molecular weight of 280,000 and 18 arms which was maleated to contain 1 percent by weight maleic anhydride were used in these experiments. All of the blend components were tumble-blended together prior to addition to the feed hopper of the extruder. The blends were prepared on one of two extruders, a 25 millimeter co-rotating Berstorff twin screw extruder or a 33 millimeter co-rotating Werner-Pfleiderer twin screw extruder. Each of the blends was then molded into test specimens on a 25 ton reciprocating screw injection molding machine. The physical properties of the blends were tested dry-as-molded. The thermal properties of the blends and pure components were tested on a Perkin-Elmer differential scanning calorimeter (DSC). The DSC samples were prepared by cutting a molded bar in half and slicing a thin (8–10 gram) sample from the exposed center of the upper half-bar. Dynamic mechanical analysis (Rheovibron) was also performed on specific blend samples. The Rheovibron samples were prepared by cutting strips from the middle of tensile bars parallel to flow by use of a diamond saw.

Table 1 gives the results for all of the Nylon 6, Nylon 6,6, and radial polymer blends prepared on both extruders. It can be seen that the Werner-Pfleiderer extruder leads to overall lower impact strengths with correspondingly higher stiffness. This may indicate that the Nylon 6 and Nylon 6,6 are not as well mixed in the Werner-Pfleiderer (WP) extruder. See, for example, that the experiments carried out at 1.70wt. Nylon 6,6 produced dramatically different results in the two extruders with the bette mixing Bergstorff producing the best results. However, even in the WP, it can be observed that the addition of Nylon 6,6 leads to improved impact performance and higher elongation.

The experiments carried out at 20% wt, polymerwere all done in the Bergstorff The compositions having less than 1% wt. Nylon 6,6 have dramatically lower NI than the three compositions of the invention (Nylon 6,6–1.6, 4, and 8% wt.).

TABLE 1

Physical Properties for N6/N66/Star Polymer Blends

| Extruder | % w N6 | % w N66 | % w Polymer | RT NI | −40° C. NI | Flex Mod | Break Str. | Elongation |
|---|---|---|---|---|---|---|---|---|
| WP | 98 | 2 | 0 | 0.7 | 0.7 | 366 | 6830 | 16.5 |
| WP | 95 | 5 | 0 | 1.1 | 0.7 | 374 | 7140 | 18.4 |
| B | 90 | 0 | 10 | 3.1 | 2.4 | 302 | 6030 | 22.4 |
| WP | 88.2 | 1.8 | 10 | 3.1 | 2.4 | 298 | 6310 | 14.6 |
| WP | 85.5 | 4.5 | 10 | 5.2 | 2.6 | 284 | 6570 | 25.6 |
| B | 83.3 | 1.7 | 15 | 8.9 | 3.6 | 234 | 5900 | 45.2 |
| WP | 83.3 | 1.7 | 15 | 4.4 | 3 | 268 | 6090 | 18.9 |
| WP | 80.75 | 4.25 | 15 | 5.7 | 3.1 | 216 | 6260 | 23.1 |
| B | 80 | 0 | 20 | 3.5 | 2.8 | 231 | 5480 | 49.5 |
| B | 79.2 | 0.8 | 20 | 5 | 3.9 | 208 | 6290 | 26 |
| B | 78.4 | 1.6 | 20 | 13.4 | 15.6 | 187 | 6760 | 123 |
| B | 76 | 4 | 20 | 21.7 | 15.5 | 191 | 6970 | 123 |
| B | 72 | 8 | 20 | 22.6 | 15.3 | 189 | 6980 | 125 |

RT NI, −40° C. NI = ⅛" Notched Izod (ft-lb/in)
Flex Mod = Mpsi
Break Str. = psi
Elongation = %

Example 2

Another series of experiments was carried out with a hydrogenated linear block copolymer of styrene and butadiene having a molecular weight of 83,500 and contains 1% maleic anhydride. The blends were formed and tested according to the procedure of Example 1. Table 2 shows the results from this study. It can be observed that the addition of Nylon 6,6 does indeed lead to improved impact strengths but only at room temperature. Further improvements are expected for blends prepared under conditions of more intensive mixing. In these experiments, the Berstorff was set up for more intensive mixing than the WP, so the results were better.

TABLE 2

Physical Properties for N6/N66/Linear Polymer Blends

| Extruder | % w N6 | % w N66 | % w Polymer | RT NI | −40° C. NI | Flex Mod | Break Str. | Elongation |
|---|---|---|---|---|---|---|---|---|
| WP | 88.2 | 1.8 | 10 | 3 | 1.9 | 308 | 6480 | 27.5 |
| WP | 85.5 | 4.5 | 10 | 4 | 2 | 291 | 6500 | 27.6 |
| WP | 83.3 | 1.7 | 15 | 4.2 | 2.3 | 280 | 6170 | 36.4 |
| WP | 80.75 | 4.25 | 15 | 4.8 | 2.3 | 269 | 6360 | 64.2 |
| B | 80 | 0 | 20 | 3 | 2.1 | 233 | 6410 | 102 |
| WP | 78.4 | 1.6 | 20 | 4 | 2.5 | 223 | 8290 | 234 |
| WP | 76 | 4 | 20 | 5.2 | 2.6 | 215 | 8210 | 210 |

I claim:

1. A process to prepare a toughened alpha-polyamide composition, comprising admixing the composition at a shear rate of at least 400 sec$^{-1}$ at a location where shear is highest, wherein the composition comprises:

a) from 15 to 25 percent by weight (%wt) of the composition of a maleic anhydride or acid functionalized polydiene polymer, b) from 65 to 84 % wt of the composition of an alpha-polyamide, and c) from 1 to 10 % wt of the composition of a polyamide prepared by copolymerzing a diamine and a dicaboxylic acid.

2. The process of claim 1, wherein the polydiene polymer is a radial or star polymer.

3. The process of claim 1, who about 20 % wt of the polydiene polymer is used.

4. The process of claim 1, wherein the shear rate is at least 600 sec$^{-1}$.

5. The process of claim 1, wherein the alpha-polyamide of (b) is Nylon 6, the polyamide of (c) is Nylon 6,6, and the functionalization on the polydiene polymer is from maleic anhydride.

6. A toughened alpha-polyamide composition produced by a process comprising admixing the composition at a shear rate of at least 400 sec$^{-1}$ at a location where shear is highest, wherein the composition comprises:

(a) from 15 to 25 percent by weight (%wt) of the composition of a maleic anhydride or acid functionalized polydiene polymer, (b) from 65 to 84 % wt of the composition of an alpha-polyamide, and (c) from 1 to 10 % wt of the composition of a polyamide prepared by copolymerizing a diainine and a dicarboxylic acid.

7. The composition of claim 6, wherein the polydiene polymer is a radial or star polymer.

8. The composition of claim 6, wherein about 20 % wt of the polydiene polymer is used.

9. The composition of claim 6, wherein the shear rate is at least 600 sec$^{-1}$.

10. The composition of claim 6, wherein the alpha-polyamide of (b) is Nylon 6, the polyamide of (c) is Nylon 6,6, and the functionalization on the polydiene polymer is from malcic anhydride.

* * * * *